(12) United States Patent
Shu

(10) Patent No.: US 9,478,218 B2
(45) Date of Patent: Oct. 25, 2016

(54) USING WORD CONFIDENCE SCORE, INSERTION AND SUBSTITUTION THRESHOLDS FOR SELECTED WORDS IN SPEECH RECOGNITION

(75) Inventor: Chang-Qing Shu, Orlando, FL (US)

(73) Assignee: Adacel, Inc., Quebec (CA)

(*) Notice: Subject to any disclaimer, the term of this patent is extended or adjusted under 35 U.S.C. 154(b) by 2045 days.

(21) Appl. No.: 12/258,093

(22) Filed: Oct. 24, 2008

(65) Prior Publication Data

US 2010/0106505 A1      Apr. 29, 2010

(51) Int. Cl.
*G10L 15/00*   (2013.01)
*G10L 15/187*  (2013.01)

(52) U.S. Cl.
CPC .................. *G10L 15/187* (2013.01)

(58) Field of Classification Search
USPC .................................. 704/231–245
See application file for complete search history.

(56) References Cited

U.S. PATENT DOCUMENTS

| | | | | |
|---|---|---|---|---|
| 4,761,815 A * | 8/1988 | Hitchcock | ...................... | 704/253 |
| 6,959,278 B1 * | 10/2005 | Shu et al. | ...................... | 704/243 |
| 7,181,395 B1 * | 2/2007 | Deligne et al. | ............... | 704/249 |
| 7,219,056 B2 * | 5/2007 | Axelrod et al. | ............... | 704/235 |
| 7,228,275 B1 * | 6/2007 | Endo et al. | ................... | 704/235 |
| 7,392,187 B2 * | 6/2008 | Bejar et al. | .................... | 704/243 |
| 7,509,259 B2 * | 3/2009 | Song | ......................... | 704/256.2 |
| 7,809,569 B2 * | 10/2010 | Attwater et al. | ............. | 704/257 |
| 7,840,404 B2 * | 11/2010 | Xi et al. | ......................... | 704/243 |
| 2002/0032549 A1 * | 3/2002 | Axelrod et al. | .................. | 703/2 |
| 2004/0199385 A1 * | 10/2004 | Deligne et al. | ............... | 704/235 |
| 2005/0027523 A1 * | 2/2005 | Tarlton et al. | ................. | 704/234 |
| 2005/0065789 A1 * | 3/2005 | Yacoub et al. | ................ | 704/231 |
| 2006/0025995 A1 * | 2/2006 | Erhart et al. | ................... | 704/239 |
| 2006/0074655 A1 * | 4/2006 | Bejar et al. | .................... | 704/243 |
| 2006/0178882 A1 * | 8/2006 | Braho et al. | ................... | 704/240 |
| 2007/0118373 A1 * | 5/2007 | Wise et al. | .................... | 704/235 |
| 2007/0192095 A1 * | 8/2007 | Braho et al. | ................... | 704/232 |
| 2007/0213982 A1 * | 9/2007 | Xi et al. | ......................... | 704/243 |
| 2008/0071533 A1 * | 3/2008 | Cave et al. | ................... | 704/235 |
| 2008/0177538 A1 * | 7/2008 | Roy et al. | ..................... | 704/235 |

OTHER PUBLICATIONS

"Word and Phone Level Acoustic Confidence Scoring", Simo O. Kamppari and Timothy J. Hazen, IEEE 2000, 4 pages.

\* cited by examiner

*Primary Examiner* — Douglas Godbold
(74) *Attorney, Agent, or Firm* — Allen Dyer Doppelt Milbrath & Gilchrist

(57) ABSTRACT

A method and system for improving the accuracy of a speech recognition system using word confidence score (WCS) processing is introduced. Parameters in a decoder are selected to minimize a weighted total error rate, such that deletion errors are weighted more heavily than substitution and insertion errors. The occurrence distribution in WCS is different depending on whether the word was correctly identified and based on the type of error. This is used to determine thresholds in WCS for insertion and substitution errors. By processing the hypothetical word (HYP) (output of the decoder), a mHYP (modified HYP) is determined. In some circumstances, depending on the WCS's value in relation to insertion and substitution threshold values, mHYP is set equal to: null, a substituted HYP, or HYP.

2 Claims, 3 Drawing Sheets

Figure 3
| WCS range | 0 <= WCS < 10 | 10<= WCS < 20 | 20<= WCS < 30 | 30<= WCS < 40 | 40<= WCS < 50 | 50<= WCS < 60 | 60<= WCS < 70 | 70<= WCS < 80 | 80<= WCS < 90 | 90<= WCS <100 | Sub-total |
|---|---|---|---|---|---|---|---|---|---|---|---|
| # Correct | 1 | 1 | 1 | 2 | 33 | 122 | 151 | 175 | 87 | 3 | 575 |
| # Insertion errors | 19 | 5 | 7 | 10 | 11 | 9 | 2 | 4 | 1 | 1 | 68 |
Total: 643
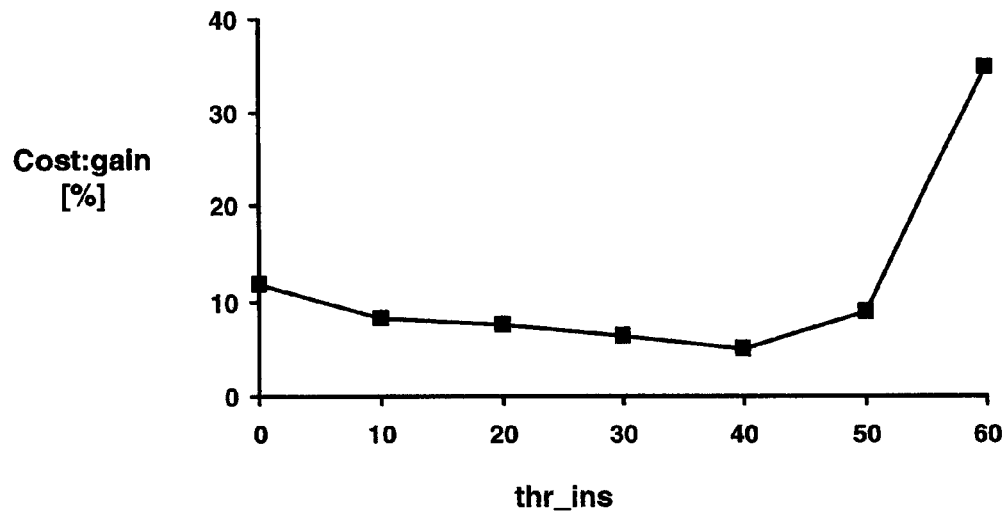
Figure 4
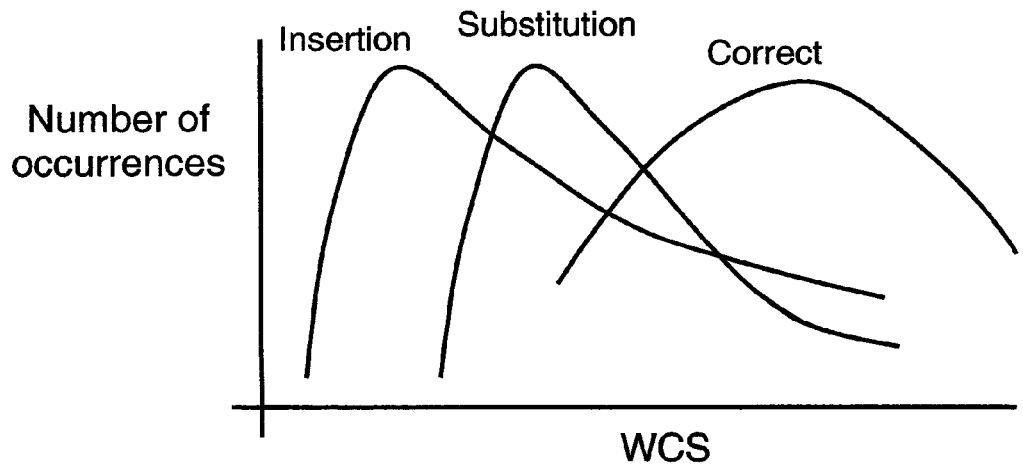
Figure 5

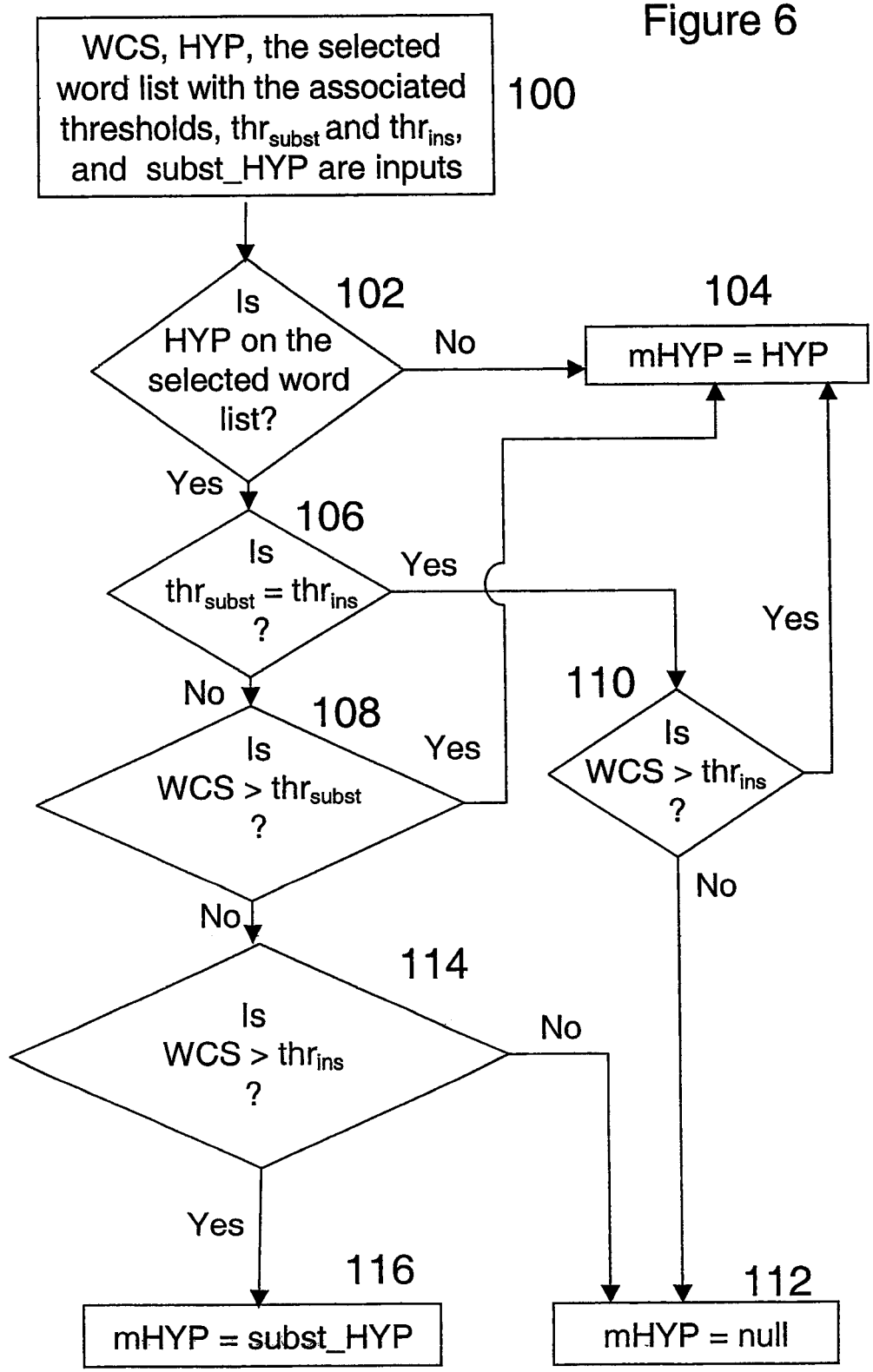

USING WORD CONFIDENCE SCORE, INSERTION AND SUBSTITUTION THRESHOLDS FOR SELECTED WORDS IN SPEECH RECOGNITION

BACKGROUND OF THE INVENTION

1. Field of the Invention

The invention in one aspect relates to is a method for dealing with speech recognition.

2. Background Art

Speech recognition systems have been under development for years and commonly used. However, a need continues to exist for improved accuracy.

It is known in the prior art to input audio data 10 to a front end 12 which extracts feature data. These feature data are input fed into a decoder 14, which with the help of an acoustic model 16 and a language model 18, outputs HYPs, the hypothetical sentence(s). HYPs consist of a series of words, such as in this document.

It is known to use a post decoder 20 to output a word confidence score, WCS, which is a measure of the confidence degree of a word/HYP. It is widely known in speech recognition to use a sentence/phrase confidence score to accept or reject phrases or sentences entirely. A more detailed description of prior development is shown in U.S. Pat. No. 6,959,278, which is incorporated by reference.

SUMMARY OF THE INVENTION

There exists an opportunity to improve recognition accuracy using WCS to reduce word recognition error rate further than shown in the prior art. To this end, a method is disclosed in which the WCS is used to improve recognition accuracy. In one embodiment, audio data are decoded to obtain a HYP and a WCS is determined in post processing, and a modified hypothetical word (mHYP) based on HYP and WCS is outputted.

The method also optionally comprehends developing a selected word list which includes words that occur frequently in the transcription and that yield high error rates.

In another approach, the method may also include determining insertion and substitution threshold values for each word on the selected word list with the substitution threshold value greater than the insertion threshold value in most cases. The insertion and substitution threshold values are preferably determined in a tuning phase in which an occurrence distribution in WCS is developed for such situations as: correct identification, insertion error, and substitution error. The insertion and substitution thresholds are based at least in part on WCS occurrence distributions.

A selected word list is optionally developed in the tuning phase based on words that frequently occur and words that have higher error rates. A mapping function may be used in the testing phase to convert each HYP to its mHYP with the following rules:

when HYP is not on the selected word list, mHYP is equal to HYP;
when WCS is greater than both the insertion and substitution threshold values, mHYP is set equal to HYP;
when WCS is less than the insertion threshold value, mHYP is a null; and
when WCS is in between the insertion and substitution threshold values, mHYP is equal to a substituted HYP.

That substituted HYP is determined in the tuning phase and, in one embodiment, is the most frequently substituted word for HYP when a substitution error occurs.

Also disclosed is a method for determining the optimized parameters for the decoder in a tuning phase to minimize a weighted total error rate, according to the following algorithm:

$$Wt\ Etotal = (\lambda sub * num\_error\_sub\_word + \lambda ins * num\_error\_ins\_word + \lambda del * num\_error\_del\_word)/total\_num\_RefWord,$$

where $\lambda sub$, $\lambda ins$, and $\lambda del$ are weighting factors; $\lambda del > \lambda sub > \lambda ins$; and num_error_sub_word, num_error_ins_word, and num_error_del_word refer to the number of substitution errors, insertion errors, and deletion errors, respectively. The total_num_RefWord refers to the total number of words in the transcript.

A method for developing a selected word list in the tuning phase is also disclosed. The selected word list is based on words that occur frequently and words which have high error rates. According to an aspect of the method, HYP words on the selected word list are processed based on their WCS to determine a mHYP, the output. The determination of mHYP is further based on substitution and insertion threshold values. The resulting mHYP is equal to HYP when WCS is greater than the substitution threshold value and equal to null when WCS is less than the insertion threshold value. When WCS is in between the substitution threshold value and the insertion threshold value, mHYP is set equal to a substituted HYP.

A system for processing audio data is also disclosed. The algorithms described herein can be performed by accessing instructions in a computer readable storage media having instructions executable by a computer. The storage media may be any of a number of memory devices including: ROMs (read-only memory) PROMs (programmable ROM), EPROMs (electrically PROM), EEPROMs (electrically erasable PROM), flash memory in its various physical variants and interface variants, and any other electric, magnetic, optical, and combination memory devices.

Word error rate in speech recognition application systems can be reduced by 25-50% when compared to prior art methods without such algorithms.

BRIEF DESCRIPTION OF THE DRAWINGS

FIG. 3 is a table of WCS frequency distribution for correct and incorrect recognition of the word "zero;"

FIG. 4 is a plot of the cost-to-gain ratio when applying a range of WCS thresholds;

FIG. 5 is a plot of frequency distribution function vs. WCS for correctly recognized words, words with insertion errors, and with substitution errors; and FIG. 6 is a flowchart of the testing phase according to an aspect of the present invention.

DETAILED DESCRIPTION OF THE PREFERRED EMBODIMENT(S)

Figure 1:
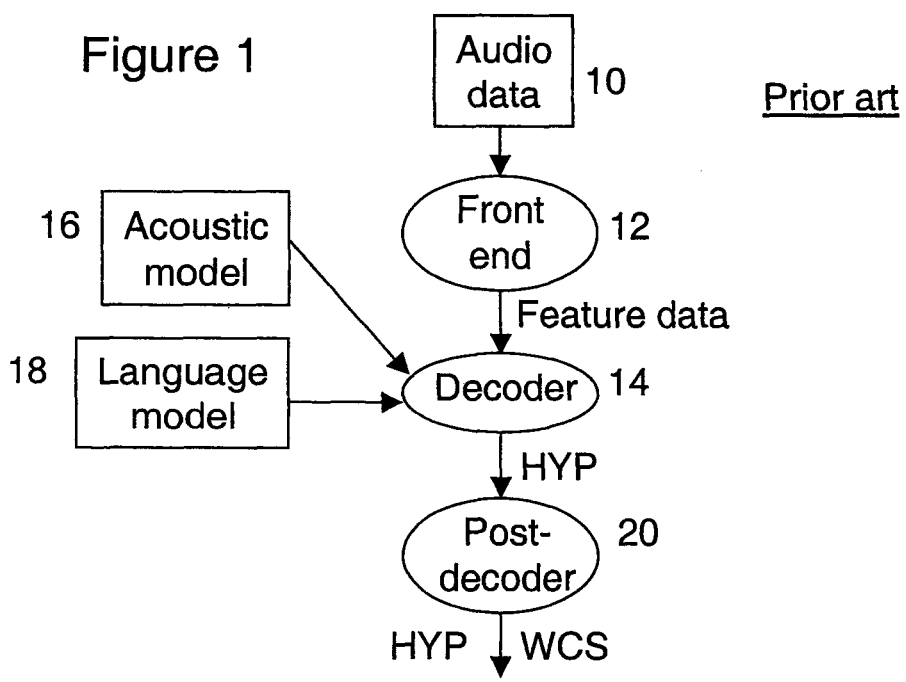
FIG. 1 is a schematic diagram of the processes involved in a speech recognition method according to the prior art.
Figure 2:
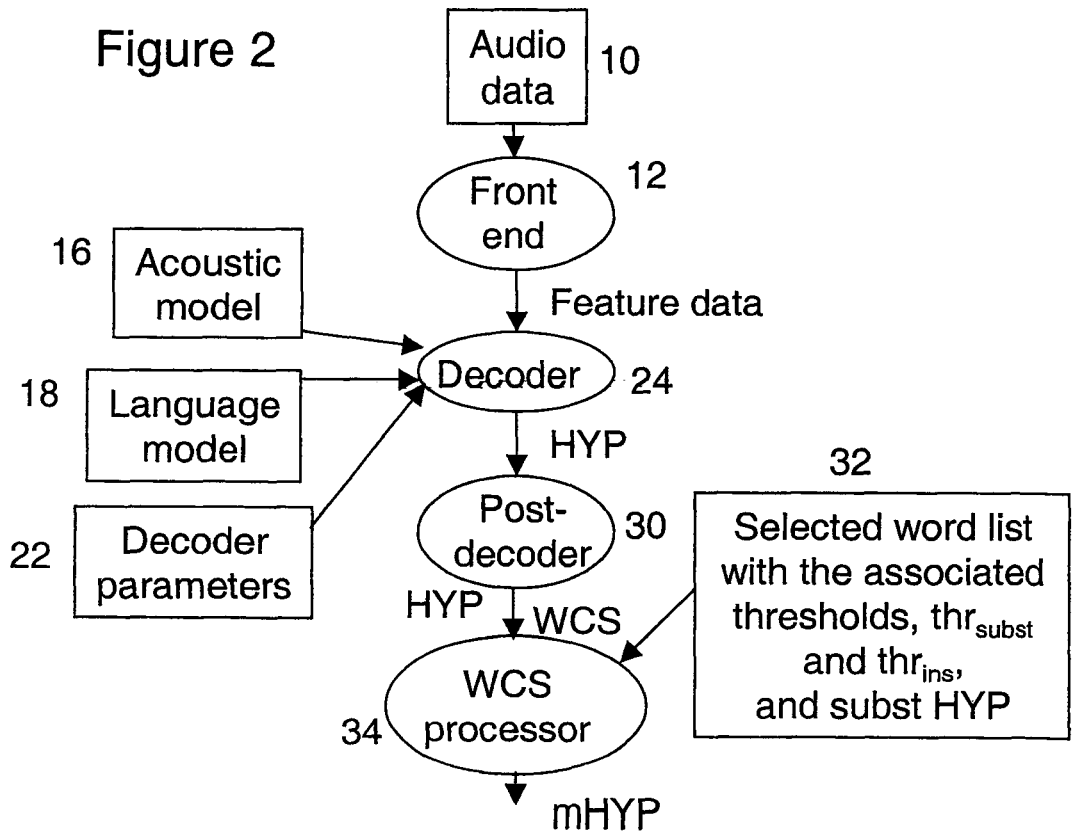
FIG. 2 is a schematic diagram of the processes involved in a speech recognition system according to an aspect of the present invention.

FIG. 1, showing a prior art method, was discussed above. In FIG. 2, audio data 10 are input to a front end 12 to extract feature data, which are provided to a decoder 24. Decoder 24 utilizes an acoustic model 16, a language model 18, and optimized decoder parameters 22. An aspect of the present invention, which will be discussed in more detail below, deals with determining the optimized decoder parameters 22. HYP, the hypothetical word, is an output from decoder 24. In a post-decoder 30, a WCS is determined. Based on HYP, WCS, and the inputs of block 32, a WCS processor 34 determines mHYP, a modified hypothetical word. The inputs of block 32 include: the selected word list, insertion and substitution thresholds for each word on the selected word list, and the substituted HYP. These inputs which will be discussed in more detail below.

There are two phases in speech recognition: a tuning phase and a testing phase. In the tuning phase, a tuning audio data set along with its transcription are input to the speech recognition system to determine the decoder parameters that provide the lowest error rate. It is known that to evaluate the minimum error rate for the decoder in the prior art with the following formula is applicable:

$$Etotal=(num\_error\_sub\_word+num\_error\_ins\_word+num\_error\_del\_word)/total\_num\_RefWord,$$

where

Etotal is the total word error rate;

num_error_sub_word is the number of substitution word errors;

num_error_ins_word is the number of insertion word errors;

num_error_del_word is the number of deletion word errors; and tot_num_RefWord is the number of words in the transcription.

According to an aspect of the present development, a weighted total error rate formula below has been employed in place of the Etotal formula above.

$$Wt\ Etotal=(\lambda sub*num\_error\_sub\_word+\lambda ins*num\_error\_ins\_word+\lambda del*num\_error\_del\_word)/total\_num\_RefWord,$$

where $\lambda$sub, $\lambda$ins, and $\lambda$del are weighting factors.

The relative values of the weighting factors are: $\lambda$del>$\lambda$subst>$\lambda$ins. The insertion weighting factor is the smallest because insertion errors are the least problematic, i.e., if an insertion error is determined, the inserted word can simply be removed in WCS processing. On the other hand, nothing can be done for the deletion error in WCS processing.

According to an aspect of the present invention, a selected word list is developed. The decoder of the prior art may be deployed, but using the decoder parameters 22 as described above. The selected words, which are generated in the tuning phase, are those which produce high error rates in insertion and/or substitution. The selected words, which are on the selected word list, are generated by:

sorting the HYP word list by occurrence from high to low;

developing two HYP word lists for insertion and substitution errors;

combining these two lists into a list showing the sum of the HYP word error; and selecting words at the top of the list that contribute significantly to the total HYP word error.

One of the advantages of the present development is that the WCS processing is performed on words that are on the selected word list, i.e., the words that occur most frequently and that have higher error rates. In this way, the WCS processing is conducted on only a portion of the total words, i.e., those words that have the most impact on error rate.

In FIG. 3, a table in WCS distribution for the word "zero" is shown. Two situations are shown: when "zero" is correctly decoded and when there was an insertion error. In one experiment, there were 643 times that the word "zero" was detected, with 575 times that it was correctly recognized and 68 times that it was incorrectly inserted. For each recognition of the word "zero," a corresponding WCS is determined. From the frequency distribution table in FIG. 3, the number of occurrences in which "zero" was correctly recognized having a WCS in between 40 and 50 is 33 and the number of insertion errors with a WCS in between 40 and 50 is 11, as an example. Cost and gain are defined as:

$$cost(thr\_ins)=error\_accept(WCS>=thr\_ins)+error\_reject(WCS<thr\_ins);\ and$$

$$gain(thr\_ins)=correct\_accept(WCS>=thr\_ins)+correct\_reject(WCS<thr\_ins),$$

where thr_ins is an insertion threshold level of WCS.

Cost relates to two situations: accepting an incorrectly inserted word and rejecting a correctly recognized word. Gain relates to two situations: accepting a correctly recognized word and rejecting an incorrectly inserted word. For the data presented in FIG. 3, the ratio of incorrectly inserted words to correctly recognized words is 68:575. This is an example of efficacy according to the prior art.

However, according to the present development cost and gain are employed. Referring again to FIG. 3 and the formulas provided above, when thr_ins=40:

$$cost(thr\_ins=40)=(11+9+2+4+0+1)+(0+1+1+2)=31;\ and$$

$$gain(thr\_ins=40)=(33+122+151+175+87+3)+(19+5+7+10)=612.$$

The cost-to-gain ratio is 31:612, which is much more favorable than a corresponding ratio of 68:575 that was realized without using WCS processing. This exemplifies an improvement of 57% compared to not using WCS processing.

In FIG. 4, cost-to-gain ratio is plotted for thr_ins between 0 and 60. At thr_ins of 40 that the cost-to-gain ratio is the lowest. This means that for a particular HYP word, "zero" in the present example, if HYP is rejected when WCS is less than 40 and accepted when WCS is greater than 40, 31 errors result out of a sample population of 643. This compares with 68 incorrect recognitions out of the same sample population of 643 that result without using WCS processing.

The granularization of 10 in WCS is used by way of example and not intended to be limiting. Any level of slicing in WCS can be used and remains within the scope of the invention.

In FIGS. 3 and 4, correctly and incorrectly decoded words are discussed. However, as described above, incorrect decoding occurs due to deletion, insertion, and substitution. Deletion errors provide no information to process. Thus, only substitution and insertion errors are discussed in more detail below.

It has been observed that a WCS frequency distribution for many words follows the pattern shown in FIG. 5. That is, for a given number of occurrences, correctly decoded words tend to have a higher WCS, substitution errors occur with WCS in a middle range, and insertion errors correspond to WCS in a lower range. According to an aspect of the present development, a substitution threshold, thr_subst, is determined similarly to the development of thr_ins described above in conjunction with FIGS. 3 and 4, i.e., by finding values for thr_subst and thr_ins which minimize the cost: gain ratio.

Referring to FIG. 6, a method to produce mHYP in WCS processing is now discussed in more detail. The inputs for the WCS processing 34 are: a series of HYP with their associated WCS, the selected word list with each word's thr_subst and thr_ins, as shown in block 100. In 102 for each HYP, it is determined whether HYP is on the selected word list. If it is not, control passes to block 104 in which mHYP is set equal to HYP. That is, there is no modification of HYP. If, however, HYP is on the selected word list in 102, control passes to 106 in which it is determined whether the two thresholds are equal. If they are, control passes to 110 in which it is determined whether WCS>thr_ins. If WCS>thr_ins, control passes to 104 in which mHYP is set to HYP. If in 110 WCS is not greater than thr_ins, control passes to 112 in which mHYP is set to null, meaning that HYP is rejected. Returning to 106, if the two thresholds are not equal, control passes to 108 in which it is determined whether WCS>thr_subst. If so, control passes to 104 in which mHYP is set to HYP. If in 108 WCS is not greater than thr_subst, control passes to 114 to determine if WCS>thr_ins. If so, mHYP is set to substHYP 116. That is, HYP is replaced with a substituted HYP. If WCS is not greater than thr_ins in 116, control passes to 112 in which mHYP is set to the null.

According to an aspect of the present development, there are multiple subst_HYPs which are made up of the top substituted words. A substitution threshold is determined for each of the substituted words depending on the distribution functions in WCS. Or, according to another embodiment of the development, there is simply one subst_HYP, which is the most frequently substituted word. In this embodiment, there is one substitution threshold value.

While particular embodiments of the invention have been shown and described, numerous variations and alternate embodiments will occur to those skilled in the art.

What is claimed is:

1. A method for recognizing speech in acoustic data, comprising:

performing a tuning phase, the tuning phase further comprising:

generating a series of hypothetical words (HYP) from a tuning audio data set in a decoder; and setting values of tunable parameters in the decoder to minimize a weighted total error rate (Wt Etotal);

wherein the weighted total error is calculated according to an algorithm:

$$Wt\ Etotal = (\lambda sub * num\_error\_sub\_word + \lambda ins * num\_error\_ins\_word + \lambda del * num\_error\_del\_word)/total\_num\_RefWord,$$

where $\lambda sub$, $\lambda ins$, and $\lambda del$ are weighting factors, at least two of which are different, num_error_sub_word is a number of substitution word errors, num_error_ins_word is a number of insertion word errors, num_error_del_word is a number of deletion word errors, and total_num_RefWord is the number of words in the transcription.

2. The method of claim 1 wherein $\lambda del > \lambda sub > \lambda ins$.

* * * * *